(12) United States Patent
Chen

(10) Patent No.: US 9,010,857 B2
(45) Date of Patent: Apr. 21, 2015

(54) CHILD SAFETY SEAT

(71) Applicant: Hong-Bo Chen, Dongguan (CN)

(72) Inventor: Hong-Bo Chen, Dongguan (CN)

(73) Assignee: BP Children's Products HK Co., Limited, Kwai Chung, N.T. (HK)

( * ) Notice: Subject to any disclaimer, the term of this patent is extended or adjusted under 35 U.S.C. 154(b) by 102 days.

(21) Appl. No.: 13/862,460

(22) Filed: Apr. 14, 2013

(65) Prior Publication Data

US 2014/0097653 A1    Apr. 10, 2014

(30) Foreign Application Priority Data

Oct. 8, 2012 (CN) .......................... 2012 1 0377570

(51) Int. Cl.
*B60N 2/28* (2006.01)

(52) U.S. Cl.
CPC ............ *B60N 2/2875* (2013.01); *B60N 2/2821* (2013.01); *B60N 2/286* (2013.01); *B60N 2/2863* (2013.01)

(58) Field of Classification Search
USPC .................. 297/256.13, 256.1, 256.16, 250.1
See application file for complete search history.

(56) References Cited

U.S. PATENT DOCUMENTS

| | | | | |
|---|---|---|---|---|
| 5,052,750 A * | 10/1991 | Takahashi et al. | ........ | 297/256.13 |
| 5,181,761 A * | 1/1993 | Meeker | ...................... | 297/256.13 |
| 5,335,964 A * | 8/1994 | Sedlack et al. | ............ | 297/256.13 |
| 5,385,387 A * | 1/1995 | Kain | .......................... | 297/256.16 |
| 5,551,751 A * | 9/1996 | Sedlack et al. | ............ | 297/256.13 |
| 5,609,393 A * | 3/1997 | Meeker et al. | ............ | 297/256.13 |
| 5,746,478 A * | 5/1998 | Lumley et al. | ............ | 297/256.13 |
| 5,890,762 A * | 4/1999 | Yoshida | .................... | 297/256.13 |
| 6,170,911 B1 * | 1/2001 | Kassai et al. | ................ | 297/250.1 |
| 6,299,249 B1 * | 10/2001 | Mori | ......................... | 297/256.13 |
| 6,428,099 B1 | 8/2002 | Kain | | |
| 6,705,676 B1 * | 3/2004 | Berringer et al. | ......... | 297/256.16 |
| 7,207,628 B2 * | 4/2007 | Eros | .............................. | 297/297 |
| 7,306,284 B2 * | 12/2007 | Horton et al. | .............. | 297/250.1 |
| 7,735,921 B2 * | 6/2010 | Hutchinson et al. | ...... | 297/256.14 |
| 7,828,381 B2 * | 11/2010 | Barger | ...................... | 297/256.13 |
| 8,186,757 B2 * | 5/2012 | Duncan et al. | ............ | 297/256.13 |
| 8,313,142 B2 * | 11/2012 | Xiao | ......................... | 297/256.16 |
| 8,317,265 B2 * | 11/2012 | Hutchinson et al. | ...... | 297/256.14 |
| 8,474,907 B2 * | 7/2013 | Weber et al. | .............. | 297/256.16 |
| 8,622,476 B2 * | 1/2014 | Karremans et al. | ........... | 297/410 |
| 2002/0084680 A1 | 7/2002 | Kain | | |

FOREIGN PATENT DOCUMENTS

| | | |
|---|---|---|
| AU | 2010241533 A1 | 6/2011 |
| EP | 0 949 113 A2 | 10/1999 |
| EP | 0 949 113 A3 | 3/2001 |
| GB | 2 362 094 A | 11/2001 |

* cited by examiner

*Primary Examiner* — Jose V Chen
(74) *Attorney, Agent, or Firm* — Winston Hsu; Scott Margo

(57) ABSTRACT

A child safety seat includes a seat body, a support foot and an angle adjusting mechanism. Two support ribs are disposed at opposite sides of a bottom of the seat body. Each of the support ribs includes a front support end and a rear support end. The support foot is disposed between the two support ribs and pivotally connected to the two support ribs. The angle adjusting mechanism selectively adjusts and fixes the support ribs and the seat body such that one of the front support end and the rear support end supports the seat body on the vehicle seat along with the support foot. Accordingly, the child safety seat of the invention is capable of adjusting an angle of the seat body and supporting the seat body securely.

8 Claims, 8 Drawing Sheets

CHILD SAFETY SEAT

BACKGROUND OF THE INVENTION

1. Field of the Invention

The invention relates to a child safety seat and, more particularly, to a child safety seat capable of adjusting an angle of a seat body and supporting the seat body securely.

2. Description of the Prior Art

Parents regularly rely on a baby carriage to help with the care of their child. However, when parents take their child outside with a long-distance travel, they may drive a vehicle. So far the safety facilities installed on the vehicle, such as safety belt, air bag, and so on, are not suitable for a child and may even cause injury on the child. To ensure safety for a child seated in a vehicle, the child nursery goods manufacturer has developed a child safety seat, which can be used to seat a child or infant and installed on a vehicle seat directly. The child safety seat is disposed on the vehicle seat for seating a child and has safety facilities for protecting the child from a traffic accident.

In prior art, a child safety seat comprises a seat body and a base generally. The seat body comprises a seat portion and a backrest portion. The backrest portion is disposed at a rear side of the seat portion and cooperates with the seat portion to form a seat region for seating a child or infant. The base is disposed at a bottom of the seat portion and used to support the child safety seat on a vehicle seat. Since the seat portion of the conventional child safety seat is connected to the base fixedly and the backrest portion is disposed at the rear side of the seat portion, a user cannot adjust a recline angle between the seat body and the base according to his/her demand such that the backrest portion of the seat body is always straight relative to the base. Even though there are some safety seats capable of adjusting recline angle, their structures are complicated. When a child or infant holds himself/herself upright in the child safety seat for a long time, he/she will feel uncomfortable. Therefore, since the conventional child safety seat may make the child or infant feel uncomfortable, it cannot be used well.

Furthermore, there are some child safety seats capable of adjusting recline angle in the market. These seats use a pivot axle to pivotally connect the seat body and the base and use an adjusting mechanism to adjust the recline angle. Since the seat body is almost supported by the pivot axle, the structure is not strong and secure while the seat is used for a long time such that it may cause injury on the child seated therein.

According to the aforesaid problems, it is necessary to develop a child safety seat capable of adjusting an angle of a seat body and supporting the seat body securely.

SUMMARY OF THE INVENTION

An objective of the invention is to provide a child safety seat capable of adjusting an angle of a seat body and supporting the seat body securely.

To achieve the aforesaid objective, the invention provides a child safety seat disposed on a vehicle seat, wherein the child safety seat comprises a seat body, a support foot and an angle adjusting mechanism. Two support ribs are disposed at opposite sides of a bottom of the seat body. Each of the support ribs comprises a front support end and a rear support end. The support foot is disposed between the two support ribs and pivotally connected to the two support ribs. The angle adjusting mechanism selectively adjusts and fixes the support ribs and the seat body such that one of the front support end and the rear support end supports the seat body on the vehicle seat along with the support foot.

Preferably, the angle adjusting mechanism comprises an axle, a linking rod and a resilient member. Two engaging portions are extended from the support foot upwardly. The axle is pivotally connected to the support foot and opposite ends of the axle are pivotally connected to the two support ribs. Opposite ends of the linking rod are slidably disposed on the two support ribs and selectively engaged with the two engaging portions. One end of the resilient member is fixed on the axle and another end of the resilient member is fixed on the linking rod. Since the support foot and the seat body are pivotally connected to each other by the axle, the seat body can rotate about the axle. Furthermore, since the engaging portion is disposed on the support foot, the linking rod can be selectively engaged with the engaging portion such that the seat body can be situated at different positions, so as to adjust an angle of the seat body. The invention has simple structure and can be used conveniently.

Specifically, a plurality of engaging grooves is formed on the engaging portion and the linking rod is selectively engaged with one of the engaging grooves. More specifically, the engaging grooves are arranged around a central axis of the axle. Since the linking rod can be engaged with different engaging grooves, the seat body can be situated at different positions by the angle adjusting mechanism accordingly.

Specifically, the angle adjusting mechanism further comprises a handle, wherein the handle comprises a holding portion, a sleeve portion and a sliding portion. The sleeve portion is sleeved on the linking rod, the sliding portion is slidably sleeved on the axle, and the holding portion is capable of being pulled. The sleeve portion can drive the linking rod to move while the holding portion is pulled, so as to switch the linking rod to different positions of the engaging portion. Specifically, the sliding portion has a sliding groove and the axle is slidably disposed in the sliding groove.

Specifically, a slot is formed on each of the two support ribs and opposite ends of the linking rod are slidably disposed in the slots. The linking rod can be driven by the handle or a force generated by the resilient member and the slots enable the linking rod, which connects the two support ribs, to slide back and forth within a limited range.

Specifically, the resilient member is an extension spring.

Preferably, the child safety seat is capable of being operated between a forward state and a backward state. The front support end and the rear support end are connected to each other obliquely. The front support end abuts against the vehicle seat when the child safety seat is situated in the forward state. The rear support end abuts against the vehicle seat when the child safety seat is situated in the backward state. After adjusting the angle of the seat body by the angle adjusting mechanism, the seat body will tilt forward or backward. Since the front support end and the rear support end are connected to each other obliquely, the front support end or the rear support end can abut against the vehicle seat completely after adjusting the angle of the seat body. Accordingly, the seat body can be supported securely, the force exerted on the child safety seat is uniform, and the safety of the child safety seat is improved.

Specifically, the support foot comprises a frame and the frame has a front end and a rear end. The front support end and the rear end abut against the vehicle seat when the child safety seat is situated in the forward state. The rear support end and the front end abut against the vehicle seat when the child safety seat is situated in the backward state.

Compared with the prior art, the invention disposes the two support ribs at opposite sides of the bottom of the seat body, installs the support foot between the two support ribs, and utilizes the angle adjusting mechanism to selectively engage the support foot, so as to adjust the angle of the seat body. Accordingly, the seat body can be used forward or backward. After adjusting the seat body forward or backward, the front support end or the rear support end of the support rib can abut against the vehicle seat such that the force exerted on the seat body is uniform, so as to prevent the force from being concentrated on the axle and the linking rod. Therefore, the seat body can be supported securely and the safety of the child safety seat can be improved greatly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
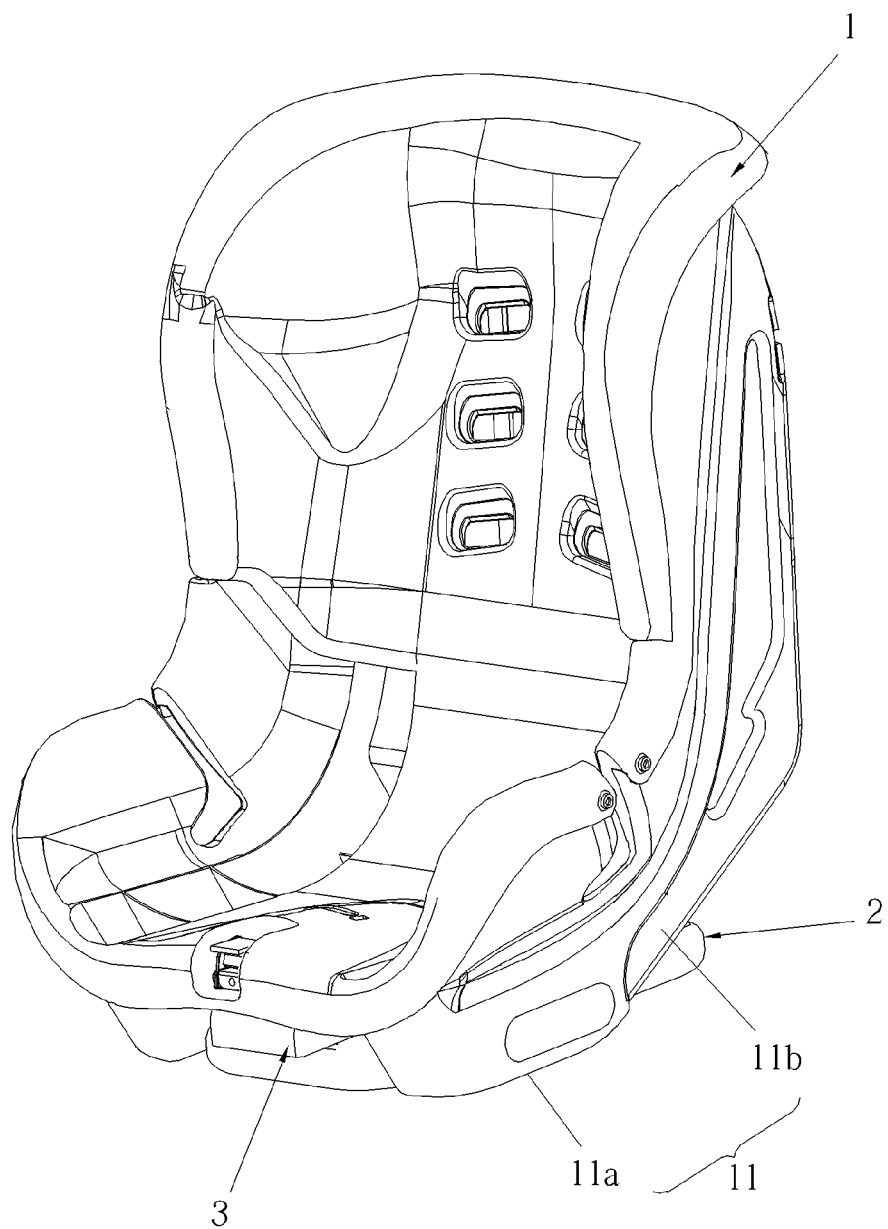
FIG. 1 is a schematic diagram illustrating a child safety seat of the invention.
Figure 2:
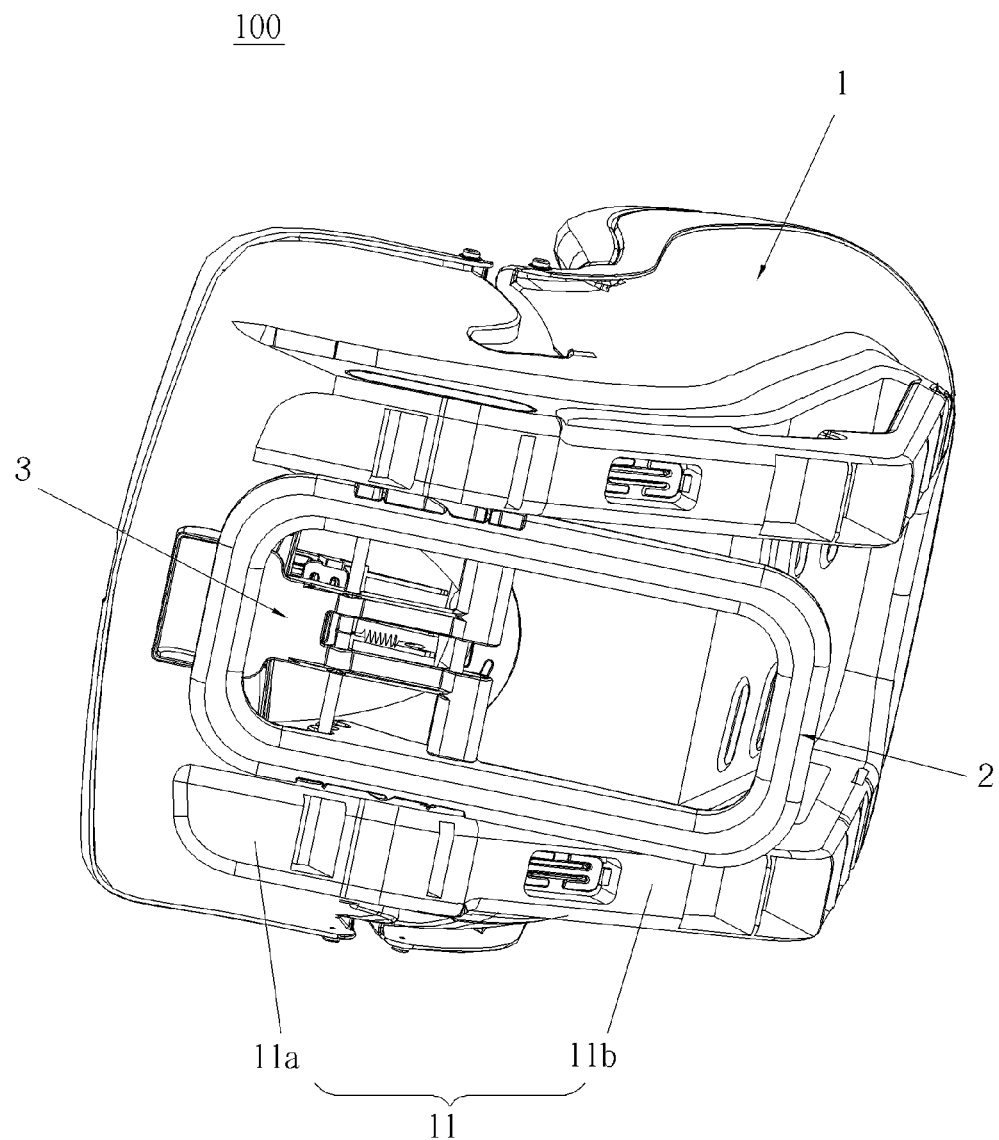
FIG. 2 is a schematic diagram illustrating the child safety seat of the invention from another viewing angle.

As shown in FIGS. 1 and 2, a child safety seat 100 of this embodiment can be disposed on a vehicle seat and comprises a seat body 1, a support foot 2 and an angle adjusting mechanism 3. Two support ribs 11 are disposed at opposite sides of a bottom of the seat body 1. Each of the support ribs 11 comprises a front support end 11a and a rear support end 11b. The support foot 2 is disposed between the two support ribs 11 and pivotally connected to middle portions of the two support ribs 11. The angle adjusting mechanism 3 selectively adjusts and fixes the support ribs 11 and the seat body 1 such that one of the front support end 11a and the rear support end 11b supports the seat body 1 on the vehicle seat along with the support foot 2.

Figure 3:
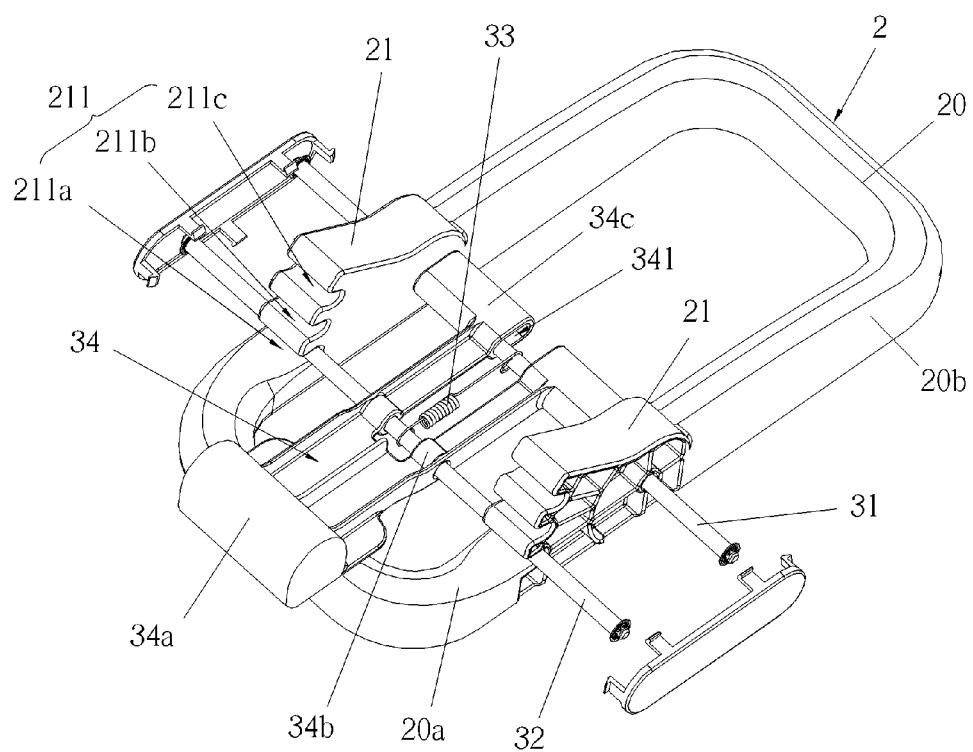
FIG. 3 is a schematic diagram illustrating an angle adjusting mechanism of the child safety seat of the invention.
Figure 4:
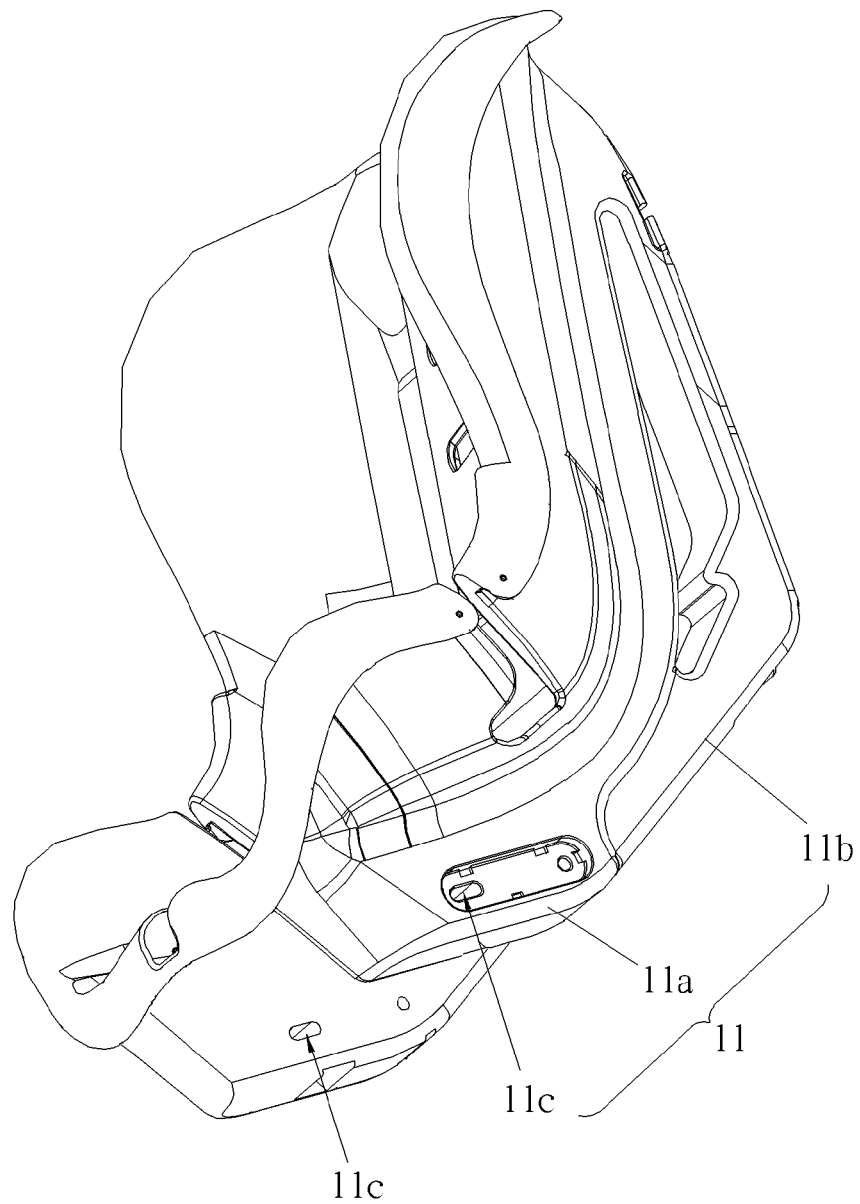
FIG. 4 is a schematic diagram illustrating a seat body of the child safety seat of the invention.

As shown in FIGS. 3 and 4, the angle adjusting mechanism 3 comprises an axle 31, a linking rod 32, a resilient member 33 and a handle 34. In this embodiment, the resilient member 33 is an extension spring. Two engaging portions 21 are extended from the support foot 2 upwardly. The axle 31 is pivotally connected to the support foot 2 and opposite ends of the axle 31 are pivotally connected to the two support ribs 11. Opposite ends of the linking rod 32 are slidably disposed on the two support ribs 11. Specifically, a slot 11c is formed on each of the two support ribs 11 and opposite ends of the linking rod 32 are slidably disposed in the slots 11c. Since the linking rod 32 is driven by the handle 34 or a force generated by the resilient member 33, the slots 11c enable the linking rod 32, which connects the two support ribs 11, to slide within a limited range. Furthermore, the linking rod 32 is selectively engaged with the two engaging portions 21.

One end of the resilient member 33 is fixed on the axle 31 and another end of the resilient member 33 is fixed on the linking rod 32. The resilient member 33 enables the linking rod 32 to move back to original position after being pulled. Since the support foot 2 and the seat body 1 are pivotally connected to each other by the axle 31, the seat body 1 can rotate about the axle 31. Furthermore, since the engaging portion 21 is disposed on the support foot 2, the linking rod 32 can be selectively engaged with the engaging portion 21 such that the seat body 1 can be situated at different positions, so as to adjust an angle of the seat body 1. Therefore, the invention has simple structure and can be used conveniently.

Figure 5:
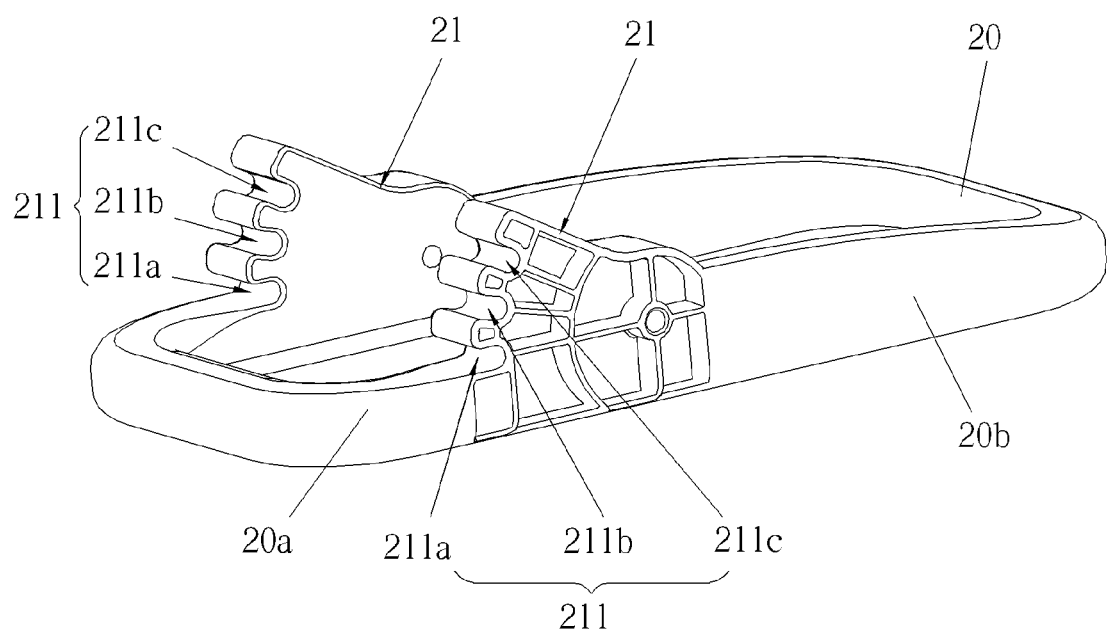
FIG. 5 is a schematic diagram illustrating a support foot of the child safety seat of the invention.

Referring to FIG. 5, a plurality of engaging grooves 211 is formed on the engaging portion 21. In this embodiment, there are three engaging grooves 211 formed on the engaging portion 21. The engaging grooves 211 are arranged around a central axis of the axle 31. The linking rod 32 is selectively engaged with one of the engaging grooves 211. The three engaging grooves 211 comprises a first engaging groove 211a, a second engaging groove 211b and a third engaging groove 211c. The first engaging groove 211a is located at the lowest end of the engaging portion 21 and used to situate the seat body 1 in a first forward state. The third engaging groove 211c is located at the highest end of the engaging portion 21 and used to situate the seat body 1 in a backward state. The second engaging groove 211b is located between the first engaging groove 211a and the third engaging groove 211c and used to situate the seat body 1 in a second forward state. Since the linking rod 32 can be engaged with different engaging grooves 211, the seat body 1 can be situated at different positions by the angle adjusting mechanism 3 accordingly.

The handle 34 comprises a holding portion 34a, a sleeve portion 34b and a sliding portion 34c, wherein the sleeve portion 34b is sleeved on a middle portion of the linking rod 32, and the sliding portion 34c is slidably sleeved on a middle portion of the axle 31. The sliding portion 34c has a sliding groove 341 and the axle 31 is slidably disposed in the sliding groove 341 such that the handle 34 can only slide within a limited range. When the handle 34 slides and drives the linking rod 32 to slide from one end of the slot 11c to the other end, the linking rod 32 is disengaged from the engaging groove 211. At this time, a rear end of the sliding groove 341 of the sliding portion 34c abuts against the axle 31 so as to restrain the handle 34 from sliding continuously. The holding portion 34 can be pulled by a user. The sleeve portion 34b can drive the linking rod 32 to move while the holding portion 34a is pulled, so as to switch the linking rod 32 to different positions of the engaging portion 21.

Referring to FIG. 4, the front support end 11a and the rear support end 11b are connected to each other obliquely. The front support end 11a abuts against a surface of the vehicle seat horizontally when the angle of the seat body 1 is adjusted forward. At this time, the seat body 1 is situated in the forward state. The rear support end 11b abuts against the surface of the vehicle seat horizontally when the angle of the seat body 1 is adjusted backward. At this time, the seat body 1 is situated in the backward state. After adjusting the angle of the seat body 1 by the angle adjusting mechanism 3, the seat body 1 will tilt forward or backward. Since the front support end 11a and the rear support end 11b are connected to each other obliquely, the front support end 11a or the rear support end 11b can abut against the vehicle seat completely after adjusting the angle of the seat body 1. Accordingly, the seat body 1 can be supported securely, the force exerted on the child safety seat 100 is uniform, and the safety of the child safety seat 100 is improved.

The support foot 2 comprises a rectangular frame 20 and the rectangular frame 20 has a front end 20*a* and a rear end 20*b*. The front support end 11*a* and the rear end 20*b* abut against the vehicle seat when the child safety seat 100 is situated in the forward state. The rear support end 11*b* and the front end 20*a* abut against the vehicle seat when the child safety seat 100 is situated in the backward state. However, the shape of the frame 20 is not limited to rectangular and may be other shapes. For example, the frame 20 may be replaced by two independent support foot without traverse connecting portions so as to achieve the same function as mentioned in the above.

Figure 6:
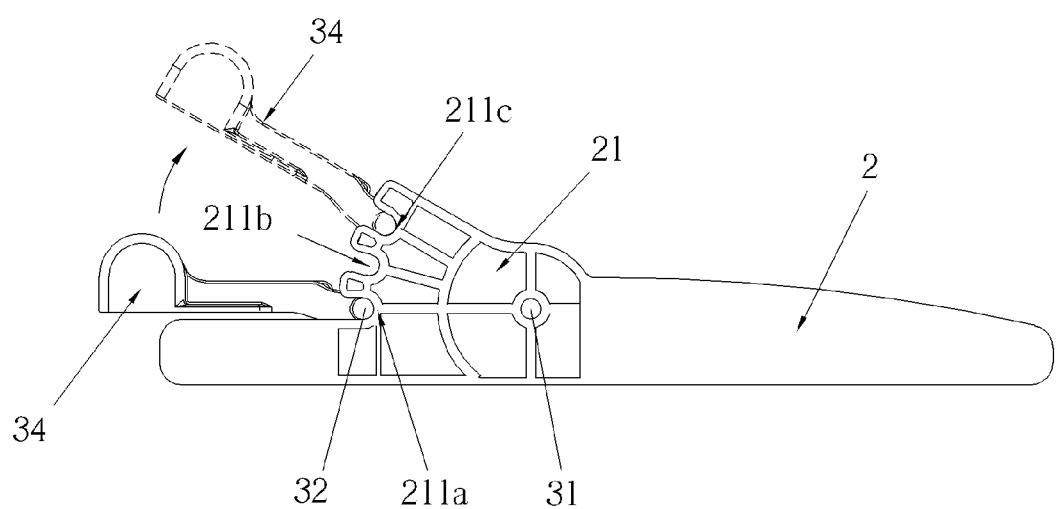
FIG. 6 is a schematic diagram illustrating the angle adjusting mechanism of the child safety seat of the invention used to adjust an angle.
Figure 7:
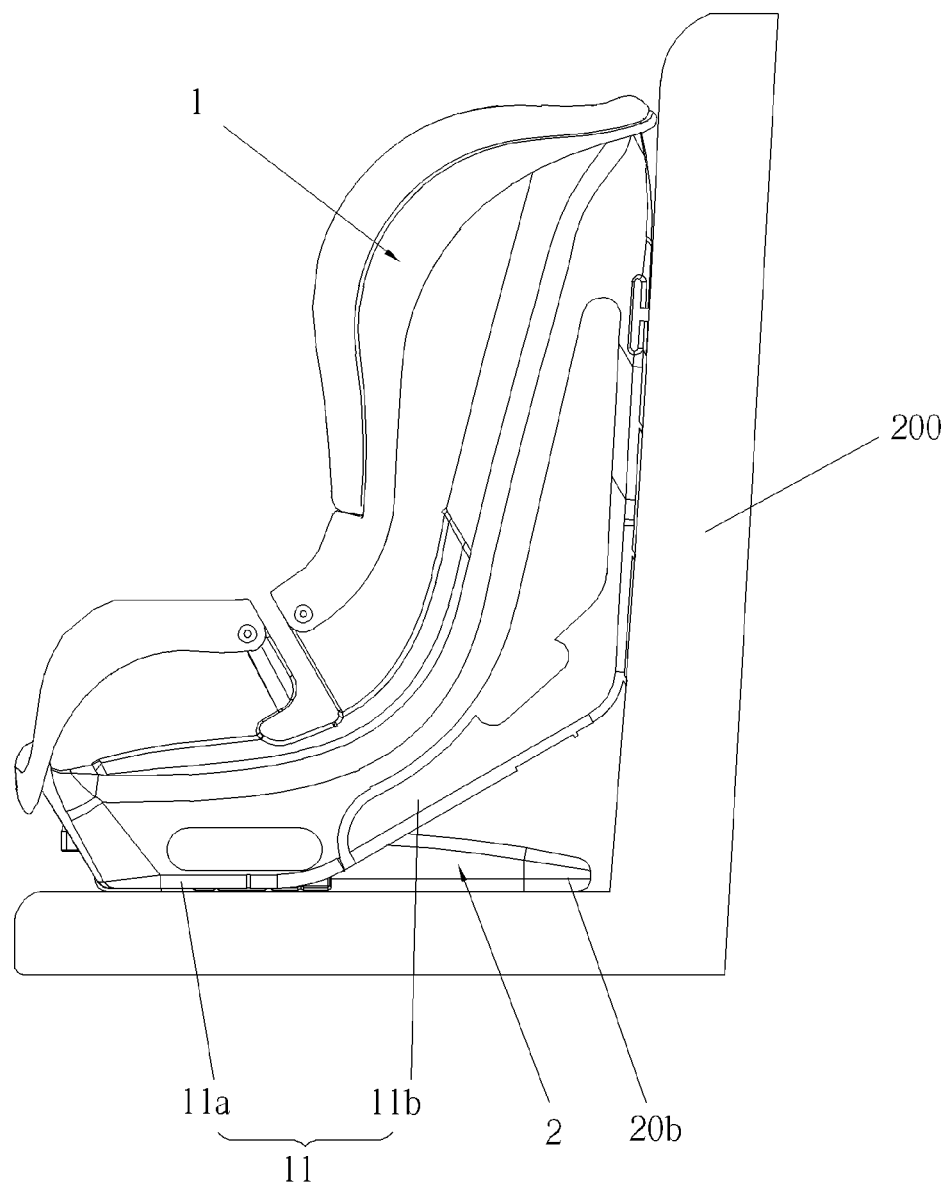
FIG. 7 is a schematic diagram illustrating the child safety seat of the invention being situated in a forward state.
Figure 8:
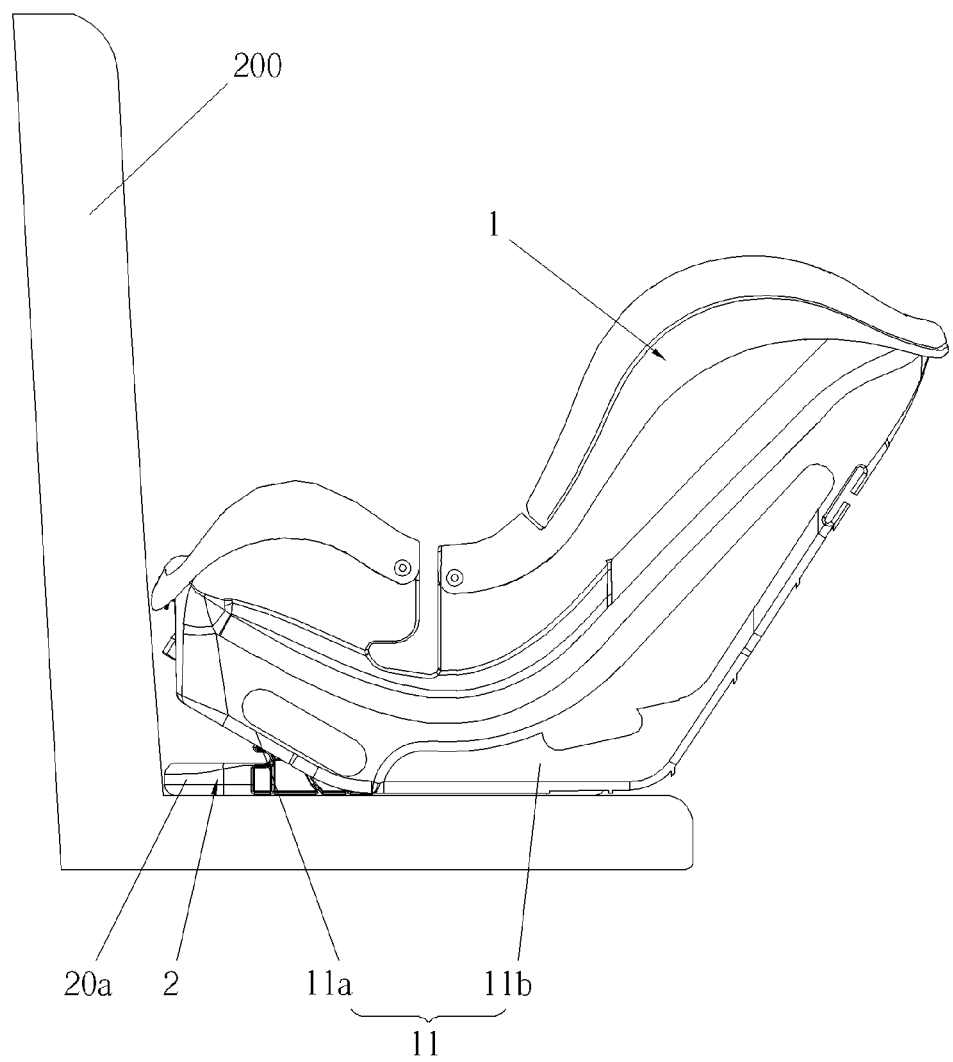
FIG. 8 is a schematic diagram illustrating the child safety seat of the invention being situated in a backward state.

Referring to FIGS. 6 to 8 along with the aforesaid description, the principle of the child safety seat 100 of the invention will be depicted in detail in the following.

When the child safety seat 100 is disposed on the vehicle seat 200, the support foot 2 abuts against the vehicle seat 200 and the seat body 1 is situated in the forward state for an elder child. At this time, the front support end 11*a* of the support rib 11 abuts against the vehicle seat 200 completely and horizontally, the resilient member 33 pulls the handle 34 tightly, and the linking rod 32 is engaged with the first engaging groove 211*a*.

When a user wants to adjust the angle of the seat body 1, he/she has to pull the handle 34. Afterward, the handle 34 moves forward and drives the linking rod 32 to move. Opposite ends of the linking rod 32 slides from the rear end of the slot 11*c* to the front end, the rear end of the sliding portion 34*c* moves forward and abuts against the axle 31, and the linking rod 32 is disengaged from the first engaging groove 211*a* and stretches the resilient member 33. At this time, the seat body 1 can be rotated clockwise about the axle 31 such that the handle 34 and the linking rod 32 rotate clockwise along with the seat body 1. When the linking rod 32 rotates to be aligned with the third engaging groove 211*c*, the user can release the handle 34 such that an elastic force generated by the resilient member 33 pulls the linking rod 32 to move and then the linking rod 32 slides from the front end of the slot 11*c* to the rear end. At this time, the linking rod 32 is engaged with the third engaging groove 211*c* and pulls the handle 34 to move backward such that the front end of the sliding portion 34*c* of the handle 34 moves backward and abuts against the axle 31. Consequently, the seat body 1 is locked. At this time, the front support end 11*a* of the support rib 11 gets away from the vehicle seat 200 and the rear support end 11*b* abuts against the surface of the vehicle seat 200 such that the seat body is situated in the backward state for a young infant. The support rib 11 and the support foot 2 cooperate with each other to support the child safety seat 100 on the vehicle seat 200 securely.

Needless to say, the linking rod 32 may be also engaged with the second engaging groove 211*b* so as to situate the seat body in the second forward state, if so desired. The operation is the same as that mentioned in the above and will not be depicted herein again.

Compared with the prior art, the invention disposes the two support ribs 11 at opposite sides of the bottom of the seat body 1, installs the support foot 2 between the two support ribs 11, and utilizes the angle adjusting mechanism 3 to selectively engage the support foot 2, so as to adjust the angle of the seat body 1. Accordingly, the seat body 1 can be used forward or backward. After adjusting the seat body 1 forward or backward, the front support end 11*a* or the rear support end 11*b* of the support rib 11 can abut against the vehicle seat 200 such that the force exerted on the seat body 1 is uniform, so as to prevent the force from being concentrated on the axle 31 and the linking rod 32. Therefore, the seat body 1 can be supported securely and the safety of the child safety seat 100 can be improved greatly.

It should be noted that the size of the seat body 1 of the child safety seat 100 of the invention and the method for installing the child safety seat 100 on the vehicle seat 200 are well known by one skilled in the art and will not be depicted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat disposed on a vehicle seat, comprising:
   a seat body, two support ribs being disposed at opposite sides of a bottom of the seat body, each of the support ribs comprising a front support end and a rear support end;
   a support foot disposed between the two support ribs and pivotally connected to the two support ribs, two engaging portions extending from the support foot upwardly; and
   an angle adjusting mechanism selectively adjusting and fixing the support ribs and the seat body such that one of the front support end and the rear support end supports the seat body on the vehicle seat along with the support foot, the angle adjusting mechanism comprising:
      an axle, the axle being pivotally connected to the support foot and opposite ends of the axle being pivotally connected to the two support ribs;
      a linking rod, opposite ends of the linking rod being slidably disposed on the two support ribs and selectively engaged with the two engaging portions;
      a resilient member, one end of the resilient member being fixed on the axle and another end of the resilient member being fixed on the linking rod; and
      a handle, comprising:
         a holding portion capable of being pulled;
         a sleeve portion sleeved on the linking rod; and
         a sliding portion being slidably sleeved on the axle.

2. The child safety seat of claim 1, wherein a plurality of engaging grooves is formed on the engaging portion and the linking rod is selectively engaged with one of the engaging grooves.

3. The child safety seat of claim 2, wherein the engaging grooves are arranged around a central axis of the axle.

4. The child safety seat of claim 1, wherein a slot is formed on each of the two support ribs and opposite ends of the linking rod are slidably disposed in the slots.

5. The child safety seat of claim 1, wherein the sliding portion has a sliding groove and the axle is slidably disposed in the sliding groove.

6. The child safety seat of claim 1, wherein the resilient member is an extension spring.

7. The child safety seat of claim 1, wherein the child safety seat is capable of being operated between a forward state and a backward state, the front support end and the rear support end are connected to each other obliquely, the front support end abuts against the vehicle seat when the child safety seat is situated in the forward state, and the rear support end abuts against the vehicle seat when the child safety seat is situated in the backward state.

8. The child safety seat of claim 7, wherein the support foot comprises a frame, the frame has a front end and a rear end, the front support end and the rear end abut against the vehicle seat when the child safety seat is situated in the forward state, and the rear support end and the front end abut against the vehicle seat when the child safety seat is situated in the backward state.

* * * * *